United States Patent
Lee et al.

(10) Patent No.: US 7,887,727 B2
(45) Date of Patent: Feb. 15, 2011

(54) PREPARING METHOD OF MICROPOROUS POLYOLEFIN FILM THROUGH EFFECTIVE EXTRUSION

(75) Inventors: Young-keun Lee, Seoul (KR); Jang-weon Rhee, Daejeon (KR); Gwi-gwon Kang, Daejeon (KR); In-hwa Jung, Chungcheongnam-do (KR)

(73) Assignee: SK Energy Co., Ltd., Seoul (KR)

( * ) Notice: Subject to any disclaimer, the term of this patent is extended or adjusted under 35 U.S.C. 154(b) by 51 days.

(21) Appl. No.: 12/084,295

(22) PCT Filed: Dec. 12, 2007

(86) PCT No.: PCT/KR2007/006487

§ 371 (c)(1),
(2), (4) Date: Apr. 29, 2008

(87) PCT Pub. No.: WO2008/072906

PCT Pub. Date: Jun. 19, 2008

(65) Prior Publication Data

US 2010/0041779 A1    Feb. 18, 2010

(30) Foreign Application Priority Data

Dec. 14, 2006    (KR) ........................ 10-2006-0127921

(51) Int. Cl.
*C08J 5/22* (2006.01)
*C08J 9/28* (2006.01)

(52) U.S. Cl. .............. 264/171.1; 264/176.1; 264/235.6; 264/235.8; 264/288.4; 264/288.8; 264/289.3; 264/291; 521/61; 521/62; 521/64; 521/84.1; 521/143

(58) Field of Classification Search .............. 264/171.1, 264/176.1, 235.6, 235.8, 288.8, 288.4, 289.3, 264/291; 521/61, 62, 64, 84.1, 143
See application file for complete search history.

(56) References Cited

U.S. PATENT DOCUMENTS

| | | |
|---|---|---|
| 4,247,498 A | 1/1981 | Castro |
| 4,539,256 A | 9/1985 | Shipman |
| 4,726,989 A | 2/1988 | Mrozinski |
| 4,867,881 A | 9/1989 | Kinzer |
| 5,051,183 A | 9/1991 | Takita et al. |
| 5,830,554 A | 11/1998 | Kaimai et al. |
| 6,245,272 B1 | 6/2001 | Takita et al. |
| 6,566,012 B1 | 5/2003 | Takita et al. |
| 2007/0218271 A1* | 9/2007 | Lee et al. ............. 428/304.4 |
| 2007/0232709 A1* | 10/2007 | Lee et al. .................. 521/80 |

FOREIGN PATENT DOCUMENTS

JP    60-163938    *    8/1985

* cited by examiner

*Primary Examiner*—Irina S Zemel
(74) *Attorney, Agent, or Firm*—Clark & Brody

(57) ABSTRACT

The present invention relates to a process for manufacturing a microporous polyolefin film which can be used for various battery separators, separating filters and membranes for microfiltration. The process for manufacturing a microporous polyolefin film according to the invention comprises mixing/extrusion through efficient and separate injection of 15-55% by weight of polyolefin (Component I), and 85-45% by weight of a diluent (Component II) which forms thermodynamic single phase with the polyolefin and a diluent (Component III) which can undergo thermodynamic liquid-liquid phase separation with the polyolefin, into an extruder.

15 Claims, No Drawings

PREPARING METHOD OF MICROPOROUS POLYOLEFIN FILM THROUGH EFFECTIVE EXTRUSION

TECHNICAL FIELD

Microporous polyolefin films have been widely used for various battery separators, separating filters and membranes for microfiltration due to their chemical stability and excellent physical properties.

BACKGROUND ART

Among the processes for preparing a microporous film from polyolefin, a wet process comprises mixing polyolefin with a diluent at a high temperature to form a single phase, which is then separated into polyolefin and the diluent during subsequent cooling step. Then the diluent is extracted to provide voids in the polyolefin film. According to the wet process, a microporous film with thin and even thickness can be produced and the physical properties of those film are also good, so that the film can be used as a battery separator of secondary batteries such as lithium ion batteries.

The wet processes for preparing a porous film are classified into solid-liquid phase separation and liquid-liquid phase separation, depending upon the way how the diluent is mixed with the polymer (resin), phase separated and forms pores. Both processes involves the same procedure until making a single phase by mixing the polymer and the diluent at a high temperature, but the difference of phase separation mechanism gives different properties of the microporous film finally obtained.

In case of solid-liquid phase separation, there occurs no phase separation until the polymer is crystallized via cooling to be solidified. In other word, as the polymer chains are crystallized, they force the diluent outside the crystals to cause phase separation. Thus, the size of the phase formed through the phase separation would be very small like the size of the polymer crystals, and the structure (shape and size) of the phase separated cannot be diversely controlled. The separator formed via this process cannot be applied to recently developed secondary battery which has high capacity due to low permeability. To improve the mechanical strength, there is no other way but to essentially raise the molecular weight of the polymer resin by mixing ultrahigh molecular weight polyolefin or the like. However, ultrahigh molecular weight polyolefin is expensive and difficult to be mixed, with largely increasing the processing load. As the representative composition of solid-liquid phase separation, polyolefins mixed with paraffin oil or mineral oil are widely known, as were disclosed by U.S. Pat. Nos. 4,539,256; 4,726,989; 5,051,183; 5,830,554; 6,245,272; 6,566,012, etc.

In case of liquid-liquid phase separation, before the polymer is crystallized and solidified, phase separation occurs between the polymer and the diluents in liquid state due to thermodynamic instability at a temperature higher than the crystallization temperature of the polymer. Thus, the shape and size of the phase formed through liquid-liquid phase separation would be changed according to the conditions of phase separation. Thus, the liquid-liquid phase separation is advantageous in that temperature of liquid-liquid phase separation and size of the phase can be controlled depending on the combination of polymers and diluents, and that the size of the phase can be diversely controlled by the difference between the thermodynamic liquid-liquid phase separation temperature and the temperature at which actual phase separation occurs, and by the retention time of individual steps. In case of a microporous film produced via a liquid-liquid phase separation process, the pore size can be controlled unlike solid-liquid phase separation and can be at least several times as large as that of a microporous film produced via solid-liquid phase separation.

A liquid-liquid phase separation process is not widely used because of difficulties in processing, in spite of the advantages described above. The first difficulty of a liquid-liquid phase separation process is that the polymer and diluent should be mixed to be single phase first at a temperature higher than the liquid-liquid phase separation temperature in the extruder, and then phase separation should be taken place. In other word, in the first stage to make a single phase, the temperature should be above the liquid-liquid phase separation temperature. During raising the temperature up to liquid-liquid phase separation temperature, thermodynamic mixing doesn't occur. Therefore, when a general extrusion process is applied, the extrusion temperature might be very high with extruding condition being complicated, to result in reducing productivity. Moreover, excessive oxidation of composition occurs during the extrusion, to cause deterioration of physical properties and durability of the microporous film produced. The second difficulty of the process is to find a diluent having suitable liquid-liquid phase separation condition (temperature) for the processing, which is not simple.

U.S. Pat. No. 4,247,498 discloses a wide variety of combinations of polymers and diluents, which can undergo liquid-liquid phase separation. It is described that diluent is extracted from the composition which was separated by liquid-liquid phase separation, to manufacture film with various thicknesses. U.S. Pat. No. 4,867,881 describes a process for manufacturing an oriented microporous film by stretching, extracting, drying and heat setting the composition which was separated by liquid-liquid phase separation. However, neither of the patents could suggest a method to maximize the effect of liquid-liquid phase separation through effective extrusion of the composition.

DISCLOSURE

Technical Problem

The object of the invention is to solve the difficulties of processing in liquid-liquid phase separation process, which cannot be extensively used in practice because of problems in processibility, in spite of its advantages to produce the products of high quality.

Technical Solution

The present inventors had tried extensive studies in order to solve the problems of the conventional techniques as described above, and found that a diluent composition having suitable liquid-liquid phase separation temperature for stable extrusion can be prepared by mixing a diluent which forms thermodynamic single phase with polyolefin and a diluent which can undergoes liquid-liquid phase separation with polyolefin. Moreover, when the diluents are separately injected into the extruder according to the process of this invention, the extrusion conditions can be simply setup without usual difficulties in extrusion process and the temperature of extrusion can be lowered to prevent excessive oxidation of the composition during the extrusion process, to avoid deterioration of physical properties and durability of the microporous film thus produced. It was found that the enhancement of mixing makes extrusion easy to provide excellent physical properties and durability of the microporous film produced according to the invention. Further, it was found that, upon using the extruding/mixing process according to the invention, enhanced mixing may result in enhanced productivity.

The object of the invention is to solve the difficulties of processing in liquid-liquid phase separation process, which cannot be extensively used in practice because of problems in processability, in spite of its advantages to produce the products of high quality.

The process for manufacturing a microporous polyolefin film according to the present invention to achieve the objectives described above comprises the steps of (a) mixing/extruding 15-55% by weight of polyolefin (Component I), and 85-45% by weight of a diluent (Component II) which forms thermodynamic single phase with the polyolefin and a diluent (Component III) which can undergo thermodynamic liquid-liquid phase separation from the polyolefin, by separately injecting them into an extruder, wherein Components I and II are injected/mixed at a location before the 1/3 of the mixing section in the extruder, and Component (III) at a location between the 1/3 and the 2/3 of the mixing section in the extruder, and the temperature after the location of injecting Component (III) is raised above the temperature of liquid-liquid phase separation of the mixture of Components (I), (II) and (III) to make the mixture into a thermodynamic single phase in the extruder;

(b) passing the melt through the section wherein the extrusion temperature is lower than the liquid-liquid phase separation temperature to carry out liquid-liquid phase separation and providing a sheet;

(c) stretching the sheet, if necessary; and (d) extracting Components (II) and (III) from the sheet, and drying.

The diluents (low molecular weight organic substances) used for a wet process for preparing a microporous polyolefin film can be divided into two groups. The one is a single phase diluent which forms a single phase with polyolefin in temperature range where polyolefin is melting, and cannot undergo liquid-liquid phase separation from polyolefin, and the other is a phase separation diluent which forms a single phase with polyolefin only at temperature above temperature where the polyolefin is molten and can undergo liquid-liquid phase separation from polyolefin.

A solid-liquid phase separation employs the single phase diluent, while a liquid-liquid phase separation employs the phase separation diluent.

When a single phase diluent is used (solid-liquid phase separation), polyolefin forms a single phase with the diluent at the moment of melting of polyolefin, so that mixing is very easy (without additional mixing process, and simply with the lapse of time, theoretically) The phase separation occurs with separation of liquid diluent when the polyolefin solidifies with lowering of temperature. Thus, it is substantially impossible to control the size of the diluent phase.

When a phase separation diluent is used (liquid-liquid phase separation), the polyolefin and diluent would not be mixed together to be a single phase if the mixing temperature is not raised above the temperature of thermodynamic liquid-liquid phase separation, even after the polyolefin is molten. If the temperature of the mixture is raised above the temperature of thermodynamic liquid-liquid phase separation, the mixtures would be mixed to be a thermodynamic single phase. In the liquid-liquid phase separation, this stage is necessary for complete mixing. After complete mixing, temperature of the mixture is maintained between the temperature of liquid-liquid phase separation of the mixture and the crystallization temperature of the polyolefin, and then liquid-liquid phase separation between the polyolefin and the diluent occurs. Individual phases thus separated are classified to a polyolefin rich phase wherein polyolefin constitutes most of the content, and a diluent rich phase wherein small amount of polyolefin is dissolved in the diluent. The two phases separated by thermodynamic phase separation undergo coarsening (aggregations in same phase) as time goes by, to increase the size of phase separated. The size of the phase separated by coarsening depends on the residence time in liquid-liquid phase separation state and the temperature maintained with liquid-liquid phase separation state. The size of individual phase increases with increase of the residence time (proportional to 1/4 square of residence time), and with increase of the difference between the temperature of liquid-liquid phase separation being occurs and the temperature of actual undergoing of the liquid-liquid phase separation. The size of individual phase continually increases until the temperature of the mixture is lowered below the crystallization temperature of the polyolefin rich phase to make the phase crystallized.

For this reason, the process for manufacturing a microporous polyolefin film via liquid-liquid phase separation enables to control the size of the phase separated, different from the process via solid-liquid phase separation. The size of the phase can be diversely controlled depending upon the difference between the temperature of thermodynamic liquid-liquid phase separation and the temperature of actual undergoing of the liquid-liquid phase separation, and the residence time of phase separation steps. Accordingly, the pore size of a microporous film manufactured via liquid-liquid phase separation can be controlled, differently from solid-liquid phase separation. It is also possible to manufacture a microporous film having the pore size with several times as large as that of a microporous film obtained via solid-liquid phase separation. If the phase separation is sufficiently achieved, the polyolefin concentration in the polyolefin rich phase increases, so that the mechanical strength of the product can be improved.

A liquid-liquid phase separation process has two disadvantages in spite of the advantages described above.

First, it is difficult to find a suitable phase separation diluent. The reason is that the mixture should be made into a thermodynamic single phase in the extruder/mixer before liquid-liquid phase separation, as described above. The process temperature for extruding polyolefin is from 160 to 300° C., but the extrusion is preferably carried out at lower temperature. Appropriate process temperature is from 160 to 260° C. Thus, the temperature for the phase separation diluent to have liquid-liquid phase separation from polyolefin should be within the range, preferably from 180° C. to 260° C. It is not easy to find the diluent which satisfies the conditions mentioned above as well as both thermal stability and safety. If any, these are undesirable in terms of economical efficiency as compared to paraffin oil that has been conventionally used in solid-liquid phase separation.

Second, it is not easy to make a thermodynamic single phase of the phase separation diluent with polyolefin. The reason is that the polyolefin and the diluent are not thermodynamically mixable until the polyolefin is molten in the mixer/extruder and the temperature rises above the liquid-liquid phase separation temperature with the phase separation diluent. Though mechanical mixing can be carried out, it hardly works because of very high viscosity of polyolefin in molten state (usually at least 100-200 folds as compared to that of diluent). For this reason, the temperature of the extruder should be maintained very high in order to mix the composition, or the residence time in the extruder should be prolonged (an extruder designed with increased length, or reduced extrusion rate) comparing to the conventional extruding process. However, this process results in deterioration of physical properties and durability of the microporous film because of excessive oxidation of the mixture during the extruding process, and mixing by this process is not easy. Further, reduced productivity and complicated manufacturing equipments lower the economical efficiency of the process.

The present inventors discovered two facts to overcome the disadvantages of liquid-liquid phase separation described above.

The first one is that the temperature of liquid-liquid phase separation between the polyolefin and the diluent can be controlled if a single phase diluent and a phase separation diluent are previously mixed. If a phase separation diluent is mixed with a single phase diluent, the temperature of liquid-liquid phase separation from polyolefin is lowered as compared to the case using the phase separation diluent alone. By using this effect, the diluent having the higher temperature of liquid-liquid phase separation than the processing temperature of polyolefin (300° C. or higher) may be used depending on the mixing ratio with the single phase diluent. In other word, various phase separation diluents may be used with a reduced amount according to the invention, to satisfy stability, safety and economical efficiency at the same time.

The second fact is that the two types of diluents are not mixed with polyolefin at the same time when a single phase diluent and a phase separation diluent are used together. If the polyolefin and the single phase diluent are previously mixed to give a single phase, and then the phase separation diluent is mixed, a microporous film having excellent properties can be obtained with enhanced productivity. Thus, when the single phase diluent and the phase separation diluent are separately injected and the processing conditions are adjusted according to the present invention, following advantages can be obtained: (1) Productivity can be enhanced by excellent mixing performance and increased extrusion rate. (2) Extrusion can be carried out at relatively low temperature, so that the problems in deterioration of physical properties and durability of the microporous film due to excessive thermal oxidation of the polyolefin and the diluent (the disadvantages generated during the course of conventional extrusion) can be overcome, to give the microporous film with excellent physical properties and durability. (3) The process can be applied in case that previous diluents mixing cannot be carried out since phase separation between single phase diluent and the phase separation diluent occurs.

On the basis of those two facts, the process for manufacturing a microporous film according to the invention comprises the steps of (a) mixing/extruding 15-55% by weight of polyolefin (Component I), and 85-45% by weight of a diluent (Component II) which form thermodynamic single phase with the polyolefin and a diluent (Component III) which can undergo thermodynamic liquid-liquid phase separation from the polyolefin, by separately injecting them into an extruder. Components I and II are injected/mixed at a location before the ⅓ of the mixing section in the extruder to be a single phase, and Component (III) at a location between the ⅓ and ⅔ of the mixing section in the extruder, and the temperature after the location of injecting Component (III) is raised above the temperature of liquid-liquid phase separation of the mixture of Components (I), (II) and (III) to form the mixture as a thermodynamic single phase within the extruder;

(b) passing the mixture through the section wherein the extrusion temperature is lower than the liquid-liquid phase separation temperature to carry out liquid-liquid phase separation and providing a sheet;

(c) stretching the sheet, if necessary; and (d) extracting Components (II) and (III) from the sheet, and drying.

For the polyolefin (Component I) of the invention, any semi-crystalline homopolymer, copolymer or a mixture thereof obtained from polymerization of ethylene, propylene, 1-butene, 4-methylpentene, 1-hexene, 1-octene or the like, such as polyethylene and polypropylene, can be used. Among them, a high density polyethylene with high crystallinity and low melting point is most preferable. Molecular weight of the polyolefin is not critical as long as the polyolefin can be cast in a sheet. However, when good physical properties are required as for a separator of a secondary battery, the higher molecular weight is the better. In this case, weight average molecular weight of polyolefin is preferably from $1 \times 10^5$ to $1 \times 10^6$, more preferably from $2 \times 10^5$ to $5 \times 10^5$.

For a single phase diluent (Component II), used can be any organic liquid compound which forms thermodynamic single phase (which does not undergo liquid-liquid phase separation from polyolefin) in overall temperature range where polyolefin is in molten state. As considering stability and safety of the process, an inert organic substance is desirable such as paraffin oil, mineral oil, wax, and the like.

For a phase separation diluent (Component III), used can be any organic liquid which is able to undergo the liquid-liquid phase separation from polyolefin (Component I) at the temperature range of 180° C.~260° C. with the composition of Component (II):Component (III)=1:4~5:1. The examples include phthalic acid ester such as dibutyl phthalate, dihexyl phthalate and dioctyl phthalate; aromatic ethers such as diphenyl ether and benzyl ether; C10~C20 fatty acids such as palmitic acid, stearic acid, oleic acid, linoleic acid and linolenic acid; C10~C20 fatty alcohols such as palmityl alcohol, stearyl alcohol and oleyl alcohol; and fatty acid esters derived from saturated or unsaturated fatty acid having 4 to 26 carbon atoms in the fatty acid group or one or two fatty acid wherein the double bond(s) of an unsaturated fatty acid has(have) been substituted by epoxy group(s), and an alcohol having from 1 to 8 hydroxy group(s) and from 1 to 10 carbon atoms through ester bond, such as palmitic acid mono-, di- or triesters, stearic acid mono-, di- or triesters, oleic acid mono-, di- or triesters, and linoleic acid mono-, di- or triesters. Only if the conditions described above are satisfied, a mixture of the diluents described above can be used as Component (III).

If the temperature of liquid-liquid phase separation becomes lower than 180° C., the temperature of the later end of extruder should be sufficiently lowered below 180° C. However, in this case the extrusion should be carried out at a temperature near the melting point of the polyolefin, so that the polyolefin would not be sufficiently molten and becomes very viscous to give mechanical overload to the extruder. Then, the surface of the sheet becomes coarse, so that extrusion process cannot be normally carried out. On the contrary, if the temperature of liquid-liquid phase separation becomes higher than 260° C., mixing at a sufficiently high temperature above 260° C. is necessary to form a thermodynamic single phase at the early stage of extrusion. However, because of excessively high temperature, oxidative decomposition of the mixture is abruptly promoted, so that products cannot have desirable physical properties.

If the weight ratio of Component II:Component III is not within the range of 1:4~5:1 to make the temperature of liquid-liquid phase separation into the range from 180 to 260° C., problems in mixing may occur. If the content of Component (III) is more than the ratio of Component II:Component III=1:4, at least ⅘ of the diluent is to be injected to a location after the ⅓ of the extruder. Thus, the overall mixing time is shortened to make mixing poor. If the weight ratio of Component II:Component III is less than the ratio of Component II:Component III=5:1, at least ⅚ of the total diluent is to be injected to a location before the ⅓ of the extruder. In this case, the amount of polyolefin (Component I) with high viscosity in comparison with that of diluents with low viscosity is too small to mix each other. The most preferable weight ratio of Component II:Component III is 1:2~4:1.

The content of polyolefin (Component I) according to the invention is preferably within the range from 15 to 55% by weight. If the content of polyolefin exceeds 55% by weight, (i.e. total amount of diluent (Component II+Component III) is less than 45% by weight), porosity and pore size are reduced. Then, permeability of the film falls abruptly owing to little interconnections between the pores. On the contrary, if the content of polyolefin is less than 15% by weight, mixing performance of polyolefin with the diluent is lowered, so that polyolefin cannot be thermodynamically mixed with the diluent. Further, the mixture is extruded in gel form to cause the problems such as breakage upon stretching and uneven thickness of the produced film.

Conventional additives to enhance specific functions, such as oxidation stabilizer, UV stabilizer, antistatic agent or the like, may be added to the composition.

An extruder for most efficient extruding/mixing of the mixture is a twin screw extruder. The polyolefin (Component I) and the single phase diluent (Component II) may be previously blended and fed to a compounder, or individually fed from the each feeders. It is desirable that the two components are fed to an earlier part of the extruder as possible in order to mix each other sufficiently before mixing with the phase separation diluent (Component III) which would be fed at a location between the ⅓ and the ⅔ of the extruder.

The temperature before feeding the phase separation diluent according to the invention is simply maintaining the temperature above the melting temperature of the polyolefin. In case of polyolefin, the temperature of about 160° C. is appropriate. Accordingly, thermal oxidation of polyolefin during extrusion can be minimized to improve the quality of the microporous film thus produced.

The phase separation diluent (Component III) is fed to a location between the ⅓ and the ⅔ of the extruder (after Component (I) and Component (II) being mixed in a single phase). Feeding it at a location after the ⅔ of the extruder is undesirable because the overall mixing performance is noticeably lowered. The temperature after the phase separation diluent (Component III) being fed is maintained above the liquid-liquid phase separation temperature of the mixture of Component (I), (II) and (III), so that the mixture becomes a thermodynamic single phase. In other word, Component (III) is mixed when Component (I) and Component (II) have already formed a single phase. Then, the melt of Component (I) and Component (II) has relatively little difference in viscosity from Component (III). Since the temperature has been already raised enough, the mixing performance is largely enhanced as compared to the case where the polyolefin (Component I) is mixed with Components (II) and (III) altogether. Thus, more amount of the mixture can be extruded/kneaded per hour in an extruder with the same size. Accordingly, the economical efficiency is largely improved.

Therefore, separated injection of the single phase diluent and the phase separation diluents with the temperature control inhibit excessive thermal oxidation in the extruder, to enhance the quality of the microporous film thus produced. Due to the increase of melting/extruding performance, the productivity and economical efficiency are noticeably increased.

The melt mixed as a single phase should pass through a section with a temperature lower than the liquid-liquid phase separation temperature in order to generate/proceed liquid-liquid separation, before it is extruded/cast in a sheet form through a die. It is preferable that the temperature is lower than the temperature of liquid-liquid phase separation of the mixture, by more than 10° C. It is also preferable that the residence time is at least 30 seconds, but it may be unrestrictedly adjusted depending upon the properties of the microporous film.

In order to prepare a shaped article with sheet form, conventional casting with water-cooled or air-cooled system, and calendaring may be applied.

Stretching may be carried out to obtain improved strength, in case that high strength is required for the film like a battery separator. Stretching may be carried out sequentially or simultaneously by means of roll type or tenter type. The stretching ratio preferably is not less than 4-fold along longitudinal (machine) and transverse direction, respectively, with from 25- to 50-fold of the overall stretching ratio. If the stretching ratio along one direction is less than 4-fold, orientation of the one direction is insufficient, so that the physical properties between the longitudinal and transverse direction are off-balanced to lower tensile strength, puncture strength, and the like. If the overall stretching ratio is less than 25-fold, local no-stretching occurs. If it is more than 50-fold, breakage upon stretching is likely to occur, further, it is disadvantageous in that the shrinkage of the final microporous film increases.

The stretching temperature varies depending on the melting temperature of the polyolefin employed, and the type and concentration of the diluent. Optimum stretching temperature is appropriately selected within the range where 30~80% by weight of the crystal portion of the polyolefin in the sheet melts. If the stretching temperature is selected from a temperature range lower than the temperature where 30% by weight of the crystal portion of the polyolefin in the sheet melts, the film lacks softness to result in bad stretching capability. Thus, the film is likely to be broken upon stretching, and local no-stretching also occurs. On the contrary, if the stretching temperature is selected from a temperature range higher than the temperature where 80% by weight of the crystal portion melts, stretching may be easy to be carried out. Though stretching is easy, deviation of thickness occurs owing to partial over-stretching, and the physical properties of the film falls abruptly owing to low orientation effect of the polymer. The extent of the crystal portion melting at certain temperature can be obtained from DSC (differential scanning calorimeter) analysis of the sheet.

The stretched film is extracted with organic solvent and dried. The organic solvent usable according to the invention is not particularly restricted. Any solvent which can extract the diluent may be employed. Preferably, methyl ethyl ketone, methylene chloride, hexane and the like may be a suitable solvent because of high extraction efficiency and rapid drying. Any conventional solvent extraction process such as immersion, spraying, and ultrasonic extraction can be used alone or in combination with each other. The content of residual diluent after the extraction should be not more than 1% by weight. If the content of residual diluent exceeds 1% by weight, the physical properties and permeability of the film are deteriorated. The amount of residual diluent (extraction capability) significantly depends on the extraction temperature and extraction time. The extraction temperature is preferably high in order to increase the solubility of the diluent in the solvent, but preferably not more than 40° C. as considering the safety with boiling of the solvent. If the extraction temperature is lower than the solidifying temperature of the diluent, the extraction efficiency is significantly reduced. Thus, the former should be higher than the latter. Extraction time varies depending on the thickness of the film, but suitably is 2~4 minutes for a conventional microporous film with usual thickness of 10~30 μm.

The film dried is subjected to heat setting step, if it is necessary to decrease the residual stress, as for battery separators, and reduce the shrinkage of final film at high temperature up to less than 5% along the longitudinal and transverse direction, respectively. Heat setting comprises holding the film and heating it, which is likely to shrink, thereby removing the residual stress. Higher heat setting temperature is advantageous in lowering the shrinkage. However, excessively high temperature partly melts the film to block the micropores and lower the permeability. Preferable heat setting temperature is selected within the range where 10~30% by weight of the crystal portion of the film melts. If the heat setting temperature is selected from a temperature range lower than the temperature at which 10% by weight of the crystal portion of the film melts, relaxation of the polyolefin molecules in the film is insufficient, so that the effect of removing residual stress of the film does not occur. If the heat setting temperature is selected from a temperature range higher than the temperature where 30% by weight of the crystal portion of the film melts, partial melting blocks the micropores to lower the permeability.

The heat setting time should be relatively shorter with higher heat setting temperature, while being relatively longer with lower heat setting temperature. Suitable heat setting time is from 5 seconds to 1 minute.

The process for manufacturing a microporous polyolefin film according to the invention as described above has following characteristics. When a mixture which can undergo liquid-liquid phase separation is extruded in order to improve the properties upon manufacturing a microporous polyolefin film, the extruding conditions can be easily established as compared to the conventional extrusion process. Further the disadvantage of resulting in deterioration of physical properties and durability of the microporous film due to excessive oxidation of the polyolefin and the diluent during the course of extrusion, can be overcome. Since the process according to the invention facilitates extrusion of the mixture and improves the physical properties and durability of the microporous film thus produced, the film can be useful for battery separators and various filters. Moreover, the excellent extrusion processibility provides high productivity.

Now the present invention is described in more detail by way of the Examples, which are not intended to restrict the scope of the invention.

MODE FOR INVENTION

EXAMPLES

Molecular weight and molecular weight distribution of polyolefin were measured by using high temperature GPC (Gel Permeation Chromatography) manufactured by Polymer Laboratory, Inc.

The polyolefin and the diluent were mixed in a twin screw extruder having 46 mm of diameter. The twin screw extruder has total 20 sections from the entrance to the final die; with each section having the same length except the final one. The mixing section was established through 12 sections (barrels) from the first one, and the length/diameter ratio of the screw equipped in the mixing section was 47. In the $14^{th}$ section, a gear pump was installed to produce a sheet with even thickness. The total residence time throughout the extruder, though slightly varying with the composition, was approximately 6 minutes, and the residence time to $12^{th}$ section (barrel) was about 3 minutes.

The extrusion was carried out with varying the injection position of Components (I), (II) and (III), and the temperature of the mixing section and the other extruding sections.

The melt was extruded through a T-shaped die and casted by using a casting roll as a sheet with thickness of 600~1,200 μm, which was then used for stretching. In order to examine gel caused by incomplete melting or mixing, a sheet with thickness of 200 μm was separately prepared and observed. To be used as a separator, there should be not more than five (5) gels in 2,000 $cm^2$ of area (based on a sheet with thickness of 200 μm).

The thermal properties of sheet for stretching were analyzed by using Differential Scanning Calorimetry (DSC). The condition of analysis was sample weight of 5 mg and scanning rate of 10° C./min.

Stretching of the sheet was carried out simultaneously by continuous tenter type stretcher with changing the stretching temperature. The stretching ratio was 6×6(MD×TD) and stretching speed was maintained as 2.0 m/min.

Extracting diluents from the film was carried out via immersion process by using methylene chloride. The residence time in the extractor was 2 minutes, and the residual diluent in the film was not more than 1% after extraction.

Heat setting was carried out by continuous tenter type frame for 15 seconds, after drying the film extracted in air.

The most important physical properties of a micorporous film, such as Puncture strength, gas permeability and shrinkage, were measured and the results are shown in Table 1.

Measurements of Physical Properties (1) Puncture strength was measured as the strength breaking the film by a pin with 1.0 mm of diameter at a speed of 120 mm/min.

(2) Gas permeability was measured by a porometer (CFP-1500-AEL manufactured by PMI Co., Ltd). Gas permeability was usually expressed by Gurley number. However, relative difference of permeability depending upon pore structure of the film cannot be noticed by Gurley number, because the effect of film thickness has not been implied. In order to solve the problem, the present invention employs Darcy's permeability constant, which is obtained from Equation 1.

$$C = (8\,F\,T\,V)/(\pi D^2 (P^2-1)) \qquad \text{<Equation 1>}$$

In the equation, C=Darcy's permeability constant; F=flow rate; T=thickness of sample; V=viscosity of gas (0.185 for $N_2$); D=diameter of sample; P=pressure.

This invention used nitrogen gas.

In the present invention, the mean value of Darcy's permeability constant in a range from 100 to 200 psi used was used.

(3) Shrinkage (%) in longitudinal direction(MD) and transverse direction (TD) were measured after aging a film at 105° C. for 10 minutes in convection oven.

Example 1

High density polyethylene (HDPE) with weight average molecular weight of $4.0 \times 10^5$ [Component I], paraffin oil (Component A of the Tables below) with 95 cSt of kinetic viscosity at 40° C. [Component II], and dibutyl phthalate (Component B of the Tables below) [Component III] were used. The contents of Components (I), (II) and (III) were 31% by weight, 46% by weight and 23% by weight, respectively. The ratio of Component (II):Component (III) was 2:1, and overall extrusion rate of all components was 15 kg/hr.

With respect to the injection method, Components (I) and (II) were previously mixed as slurry and injected to #1 barrel section of the extruder, while Component (III) was injected to #6 section which is between the ⅓ and the ⅔ of the mixing section. (Overall mixing section consists of 12 sections.)

The temperature prior to the injection of Component (III) was 170° C., being slightly higher than the melting temperature of the high density polyethylene. The temperature after the injection of Component (III) was 230° C., being above the temperature of liquid-liquid phase separation. The temperature after the mixing section was 180° C., being lower than the temperature of liquid-liquid phase separation.

Stretching, extraction and heat setting were carried out on the basis of basic conditions described above. Extraction was carried out through immersion process by using methylene chloride. Residence time in the extractor was 2 minutes, and the residual diluent in the film was not more than 1%. Detailed conditions for stretching and heat setting are shown in the Tables below.

Example 2

High density polyethylene (HDPE) with weight average molecular weight of $2.1 \times 10^5$ [Component I], paraffin oil (Component A of the Tables below) with 95 cSt of kinetic viscosity at 40° C. [Component II], and a mixture of oleic triglyceride and linoleic triglyceride (1:2) (Component C of the Tables below) [Component III] were used. The contents of Components (I), (II) and (III) were 45% by weight, 44% by weight and 11% by weight, respectively. The ratio of Component (II):Component (III) was 4:1, and overall extrusion rate of all components was 20 kg/hr.

With respect to the injection method, Components (I) and (II) were injected to #1 section and #2 section, respectively. Component (III) was injected to #8 section which is between the ⅓ and the ⅔ of the mixing section.

The temperature prior to the injection of Component (III) was 180° C., as was in Example 1. The temperature after the injection of Component (III) was 230° C., being above the temperature of liquid-liquid phase separation. The temperature after the mixing section was 170° C., being lower than the temperature of liquid-liquid phase separation.

Detailed conditions for stretching and heat setting are shown in the Tables below, and the extraction condition was the same as that of Example 1.

Example 3

High density polyethylene (HDPE) with weight average molecular weight of $4.0 \times 10^5$ [Component I], paraffin oil (Component A of the Tables below) with 95 cSt of kinetic viscosity at 40° C [Component II], and linseed oil (Component D of the Tables below) [Component III] were used. The contents of Components (I), (II) and (III) were 35% by weight, 13% by weight and 52% by weight, respectively. The ratio of Component (II):Component (III) was 1:4, and overall extrusion rate of all components was 10 kg/hr.

With respect to the injection method, Components (I) and (II) were injected to #1 section and #3 section, respectively. Component (III) was injected to #5 section which is between the ⅓ and the ⅔ of the mixing section.

The temperature prior to the injection of Component (III) was 170° C., being slightly higher than the melting temperature of the high density polyethylene. The temperature after the injection of Component (III) was 250° C., being above the temperature of liquid-liquid phase separation. The temperature after the mixing section was 200° C., being lower than the temperature of liquid-liquid phase separation.

Detailed conditions for stretching and heat setting are shown in the Tables below, and the extraction condition was the same as that of Example 1.

Comparative Example 1

High density polyethylene (HDPE) with weight average molecular weight of $4.0 \times 10^5$ [Component I], paraffin oil (Component A of the Tables below) with 95 cSt of kinetic viscosity at 40° C. [Component II], and a mixture of oleic triglyceride and linoleic triglyceride (1:2) (Component C of the Tables below) [Component III] were used. The contents of Components (I), (II) and (III) were 30% by weight, 35% by weight and 35% by weight, respectively. The ratio of Component (II):Component (III) was 1:1, and overall extrusion rate of all components was 10 kg/hr.

With respect to the injection method, Components (I) and (II) were previously mixed in slurry and separately injected to #1 section and #2 section in the same amount, while Component (III) was injected to #10 section which is after the ⅔ of the mixing section.

The temperature prior to the injection of Component (III) was 180° C., as was in Example 1. The temperature after the injection of Component (III) was 250° C., being above the temperature of liquid-liquid phase separation. The temperature after the mixing section was 200° C., being lower than the temperature of liquid-liquid phase separation.

The later steps including stretching, extraction and heat setting could not be executed because of too much gels and rough surface of the sheet produced.

Comparative Example 2

High density polyethylene (HDPE) with weight average molecular weight of $4.0 \times 10^5$ [Component I], paraffin oil (Component A of the Tables below) with 95 cSt of kinetic viscosity at 40° C. [Component II], and dibutyl phthalate (Component B of the Tables below) [Component III] were used. The contents of Components (I), (II) and (III) were 40% by weight, 50% by weight and 10% by weight, respectively. The ratio of Component (II):Component (III) was 5:1, and overall extrusion rate of all components was 10 kg/hr.

With respect to the injection method, Components (I) and (II) were injected to #1 section and #2 section, respectively. Component (III) was injected to #6 section which is between the ⅓ and the ⅔ of the mixing section.

The temperature both prior to and after the injection of Component (III) was 180° C., being lower than the temperature of liquid-liquid phase separation.

The later steps including stretching, extraction and heat setting could not be executed because of badness (gel and surface) of the sheet produced.

Comparative Example 3

High density polyethylene (HDPE) with weight average molecular weight of $2.1 \times 10^5$ [Component I], paraffin oil (Component A of the Tables below) with 95 cSt of kinetic viscosity at 40° C. [Component II], and a mixture of oleic triglyceride and linoleic triglyceride (1:2) (Component C of the Tables below) [Component III] were used. The contents of Components (I), (II) and (III) were 58% by weight, 6% by weight and 36% by weight, respectively. The ratio of Component (II):Component (III) was 1:6, and overall extrusion rate of all components was 10 kg/hr.

With respect to the injection method, Components (I) and (II) were injected to #1 section and #2 section, respectively. Component (III) was injected to #3 section which is before the ⅓ of the mixing section.

The temperature prior to the injection of Component (III) was 180° C., as was in Example 1. The temperature after the injection of Component (III) was 280° C., being above the temperature of liquid-liquid phase separation. The temperature after the mixing section was 220° C., being lower than the temperature of liquid-liquid phase separation.

The later steps including stretching, extraction and heat setting could not be executed because of badness (gel and surface) of the sheet produced.

Comparative Example 4

High density polyethylene (HDPE) with weight average molecular weight of $4.0 \times 10^5$ [Component I], paraffin oil (Component A of the Tables below) with 95 cSt of kinetic viscosity at 40° C. [Component II], and dibutyl phthalate (Component B of the Tables below) [Component III)] were used. The contents of Components (I), (II) and (III) were 40% by weight, 10% by weight and 50% by weight, respectively. The ratio of Component (II):Component (III) was 1:5, and overall extrusion rate of all components was 10 kg/hr.

With respect to the injection method, Components (I), (II) and (III) were previously mixed in slurry and injected to #1 section altogether.

The temperature of mixing section was 270° C., being higher than the temperature of liquid-liquid phase separation, while the temperature after the mixing section was 200° C., being lower than the temperature of liquid-liquid phase separation.

The later steps including stretching, extraction and heat setting could not be executed because of badness (gel and surface) of the sheet produced.

Comparative Example 5

High density polyethylene (HDPE) with weight average molecular weight of $2.1 \times 10^5$ [Component I], paraffin oil (Component A of the Tables below) with 95 cSt of kinematic viscosity at 40° C. [Component II], and dibutyl phthalate (Component B of the Tables below) [Component III] were used. The contents of Components (I), (II) and (III) were 25% by weight, 50% by weight and 25% by weight, respectively. The ratio of Component (II):Component (III) was 2:1, and overall extrusion rate of all components was 15 kg/hr.

With respect to the injection method, Components (I) was injected to #1 section, while Components (II) and (III) were previously mixed and separately injected to #2 section and #5 section in the same amount.

The temperature of the overall mixing section was 270° C., being higher than the temperature of liquid-liquid phase separation, while the temperature after the mixing section was 200° C., being lower than the temperature of liquid-liquid phase separation.

The product was not suitable for commercialization since the number of gels was largely increased owing to poor mixing, but stretching, extraction and heat setting were carried out to determine the physical properties. Detailed conditions are shown in the Tables below. The extraction condition was the same as that of Example 1.

Comparative Example 6

High density polyethylene (HDPE) with weight average molecular weight of $4.0 \times 10^5$ [Component I], paraffin oil (Component A of the Tables below) with 95 cSt of kinetic viscosity at 40° C. [Component II], and a mixture of oleic triglyceride and linoleic triglyceride (1:2) (Component C of the Tables below) [Component III] were used. The contents of Components (I), (II) and (III) were 10% by weight, 30% by weight and 60% by weight, respectively. The ratio of Component (II):Component (III) was 1:2, and overall extrusion rate of all components was 20 kg/hr.

With respect to the injection method, Component (I) was injected to #1 section, while Components (II) and (III) were previously mixed and separately injected to #2 section and #5 section in the same amount.

The temperature of the overall mixing section was 250° C., being higher than the temperature of liquid-liquid phase separation, while the temperature after the mixing section was 200° C., being lower than the temperature of liquid-liquid phase separation.

The product was not suitable for commercialization since the number of gels was largely increased owing to poor mixing, but stretching, extraction and heat setting were carried out to determine the physical properties. Detailed conditions are shown in the Tables below. The extraction condition was the same as that of Example 1.

Experimental conditions of Examples and Comparative Examples described above and the results therefrom are summarized in Tables 1 through 4 below:

TABLE 1

| | | | Examples | | |
|---|---|---|---|---|---|
| | | Unit | 1 | 2 | 3 |
| Component I | Type | — | HDPE | HDPE | HDPE |
| | Mw | g/mol | $4.0 \times 10^5$ | $2.1 \times 10^5$ | $4.0 \times 10^5$ |
| | Content | wt % | 31 | 45 | 35 |
| Component II | Component | — | A | A | A |
| | Content | wt % | 46 | 44 | 13 |
| Component III | Component | — | B | C | D |
| | Content | wt % | 23 | 11 | 52 |
| Component II:Component III | | — | 2:1 | 4:1 | 1:4 |
| Total feeding rate | | kg/hr | 15 | 20 | 10 |
| Injection method/position (total 12 mixing sections) | Component I | — | After premixing #1 | #1 | #1 |
| | Component II | | | #2 | #3 |
| | Component III | | #6 | #8 | #5 |

TABLE 1-continued

|  |  | Unit | 1 | 2 | 3 |
|---|---|---|---|---|---|
| Extrusion temperature | Before injecting Component III | °C. | 170 | 180 | 170 |
|  | Component III mixing section after injecting Component III |  | 230 | 230 | 250 |
|  | After mixing section |  | 180 | 170 | 200 |
| Extrusion state | Numbers of gels | #gel/2000 cm$^2$ | 0 | 1 | 2 |

Extrusion Characteristics

TABLE 2

| Manufacturing condition |  | Unit | 1 | 2 | 3 |
|---|---|---|---|---|---|
| Stretching | Temperature | °C. | 120 | 125 | 124 |
|  | Ratio (MD × TD) | Ratio | 6 × 6 | 6 × 6 | 6 × 6 |
| Heat setting | Temperature | °C. | 124 | 125 | 125 |
|  | Time | sec | 15 | 15 | 15 |
| Film thickness |  | μm | 16 | 20 | 12 |

TABLE 2-continued

| Manufacturing condition | Unit | 1 | 2 | 3 |
|---|---|---|---|---|
| Puncture strength | N/μm | 0.28 | 0.25 | 0.30 |
| Gas permeability | 10$^{-5}$ Darcy | 2.0 | 1.8 | 2.2 |
| Shrinkage MD | % | 5.0 | 4.7 | 4.5 |
| TD |  | 2.5 | 2.3 | 3.2 |

Properties of Microporous Film

TABLE 3

|  |  |  | Comparative Examples |  |  |  |  |  |
|---|---|---|---|---|---|---|---|---|
|  |  | Unit | 1 | 2 | 3 | 4 | 5 | 6 |
| Component I | Type | — | HDPE | HDPE | HDPE | HDPE | HDPE | HDPE |
|  | Mw | g/mol | 4.0 × 10$^5$ | 4.0 × 10$^5$ | 2.1 × 10$^5$ | 4.0 × 10$^5$ | 2.1 × 10$^5$ | 4.0 × 10$^5$ |
|  | Content | wt % | 30 | 40 | 58 | 40 | 25 | 10 |
| Component II | Component | — | A | A | A | A | A | A |
|  | Content | wt % | 35 | 50 | 6 | 10 | 50 | 30 |
| Component III | Component | — | C | B | C | B | B | C |
|  | Content | wt % | 35 | 10 | 36 | 50 | 25 | 60 |
| Component II:Component III |  | — | 1:1 | 5:1 | 1:6 | 1:5 | 2:1 | 1:2 |
| Total feeding rate |  | kg/hr | 10 | 10 | 10 | 10 | 15 | 20 |
| Method/position of injection (Total 12 mixing sections) | Component I | — | After premixing, #1, #2, separately | #1 | #1 | After premixing, #1 | #1 | #1 |
|  | Component II |  |  | #2 | #2 |  | After premixing, #2, #5, separately | After premixing, #2, #5, separately |
|  | Component III |  | #10 | #6 | #3 |  |  |  |
| Extrusion temperature | Before injecting III | °C. | 180 | 180 | 180 | 270 | 270 | 250 |
|  | After injecting III, extruding section |  | 250 | 180 | 280 | 270 | 270 | 250 |
|  | After extrusion section |  | 200 | 180 | 220 | 200 | 200 | 200 |
| Extrusion state | Number of gels | #Gel/2000 cm$^2$ |  |  |  |  | 7 | 33 |

Extrusion Characteristics

TABLE 4

| Manufacturing condition | | Unit | Comparative Examples | | | | | |
|---|---|---|---|---|---|---|---|---|
| | | | 1 | 2 | 3 | 4 | 5 | 6 |
| Stretching | Temperature | °C. | Could not be stretched | | | | 121 | 116 |
| | Ratio (MD × TD) | Ratio | | | | | 6 × 6 | 6 × 6 |
| Heat setting | Temperature | °C. | | | | | 124 | 124 |
| | Time | sec | | | | | 15 | 15 |
| Film thickness | | μm | | | | | 12 | 15 |
| Puncture strength | | N/μm | | | | | 0.15 | 0.12 |
| Gas permeability | | $10^{-5}$ Darcy | | | | | 2.0 | 2.5 |
| Shrinkage | MD | % | | | | | 4.0 | 4.8 |
| | TD | | | | | | 2.7 | 4.0 |

Properties of Microporous Film

INDUSTRIAL APPLICABILITY

As is shown, according to the invention, establishment of the extrusion condition is easier as compared to a conventional extrusion process, when a mixture which can undergo liquid-liquid phase separation is extruded in order to enhance the properties at the time of preparing a microporous polyolefin film. The process according to the invention may overcome the disadvantage of causing excessive oxidation of polyolefin and diluent during the extrusion to result in deterioration of physical properties and durability of the microporous film. This process facilitates extrusion of the mixture and simultaneously enhances physical properties and durability of the microporous film to make it useful for battery separators and various filters. Further, the process according to the invention provides excellent extrusion processibility and high productivity.

The invention claimed is:

1. A process for preparing a microporous polyolefin film, which comprises the steps of
   (a) mixing 15-55% by weight of polyolefin (Component I), and 85-45% by weight of a diluent (Component II) which forms thermodynamic single phase with the polyolefin and a diluent (Component III) which can undergo thermodynamic liquid-liquid phase separation with the polyolefin by separately injecting them into an extruder, wherein Components I and II are injected/mixed at a location before the ⅓ of the extruder, and Component (III) at a location between ⅓ and the ⅔ of the extruder, and the temperature after the location of injecting Component (III) is raised above the temperature of liquid-liquid phase separation of the mixture of Components (I), (II) and (III) to make the mixture into thermodynamic single phase within the extruder;
   (b) passing the melt through the section wherein the extrusion temperature is not higher than the liquid-liquid phase separation temperature and provide a sheet; and
   (c) extracting Components (II) and (III) from the sheet, and drying.

2. A process for preparing a microporous polyolefin film according to claim 1, wherein Component (II) is a diluent selected from the group consisting of paraffin oil, mineral oil and waxes, which form a thermodynamic single phase with Component (I) at a temperature higher than the melting point of Component (I).

3. A process for preparing a microporous polyolefin film according to claim 1, wherein Component (III), when being mixed with Component (I) and Component (II) to form a mixture of Components (I), (II) and (III), is a diluent which can undergo liquid-liquid phase separation at a temperature from 180° C. to 260° C.

4. A process for preparing a microporous polyolefin film according to claim 3, the diluent which are, as component (III), one or more diluent(s) selected from the group consisting of phthalic acid ester such as dibutyl phthalate, dihexyl phthalate and dioctyl phthalate; aromatic ethers such as diphenyl ether and benzyl ether; C10~C20 fatty acids such as palmitic acid, stearic acid, oleic acid, linoleic acid and linolenic acid; C10~C20 fatty alcohols such as palmityl alcohol, stearyl alcohol and oleyl alcohol; and fatty acid esters derived from saturated or unsaturated fatty acid having 4 to 26 carbon atoms in the fatty acid group or one or two fatty acid wherein the double bond(s) of an unsaturated fatty acid has(have) been substituted by epoxy group(s), and an alcohol having from 1 to 8 hydroxy group(s) and from 1 to 10 carbon atoms through ester bond, such as palmitic acid mono-, di- or triesters, stearic acid mono-, di- or triesters, oleic acid mono-, di- or triesters, and linoleic acid mono-, di- or triesters.

5. A process for preparing a microporous polyolefin film according to claim 3, wherein the weight ratio of Component (II) to Component (III) is from 1:4 to 5:1.

6. A process for preparing a microporous polyolefin film according to claim 1, wherein the section of liquid-liquid phase separation through which the single phase melt passes is the inside of the extruder before solidification of the single phase melt into a sheet or the section after extrusion and before the cooling.

7. A process for preparing a microporous polyolefin film according to claim 1, wherein the extracted/dried film is subjected to heat setting.

8. A process for preparing a microporous polyolefin film according to claim 1, which further comprises a step for stretching the sheet.

9. A process for preparing a microporous polyolefin film according to claim 8, wherein the stretching is carried out at a temperature between the melting temperature of the sheet and the temperature lower than the melting temperature by 20° C., and by sequential or simultaneous biaxial stretcher including a roll type or a tenter type, with not less than 4-fold of the stretching ratio along each axis, but with not more than 50-fold of the overall stretching ratio.

10. A process for preparing a microporous polyolefin film according to claim 2, which further comprises a step for stretching the sheet.

11. A process for preparing a microporous polyolefin film according to claim 3, which further comprises a step for stretching the sheet.

12. A process for preparing a microporous polyolefin film according to claim 4, which further comprises a step for stretching the sheet.

13. A process for preparing a microporous polyolefin film according to claim 5, which further comprises a step for stretching the sheet.

14. A process for preparing a microporous polyolefin film according to claim 6, which further comprises a step for stretching the sheet.

15. A process for preparing a microporous polyolefin film according to claim 7, which further comprises a step for stretching the sheet.

* * * * *